United States Patent
Thai

(10) Patent No.: US 11,045,280 B2
(45) Date of Patent: Jun. 29, 2021

(54) DENTAL MATRIX BANDS

(71) Applicant: Hung M. Thai, San Jose, CA (US)

(72) Inventor: Hung M. Thai, San Jose, CA (US)

(*) Notice: Subject to any disclaimer, the term of this patent is extended or adjusted under 35 U.S.C. 154(b) by 118 days.

(21) Appl. No.: 16/239,062

(22) Filed: Jan. 3, 2019

(65) Prior Publication Data

US 2019/0350679 A1 Nov. 21, 2019

Related U.S. Application Data

(63) Continuation-in-part of application No. 15/980,414, filed on May 15, 2018, now Pat. No. 10,524,878.

(51) Int. Cl.
*A61C 5/85* (2017.01)
*A61C 19/04* (2006.01)
*A61C 5/88* (2017.01)

(52) U.S. Cl.
CPC ............ *A61C 5/85* (2017.02); *A61C 5/88* (2017.02); *A61C 19/04* (2013.01)

(58) Field of Classification Search
CPC .. A61C 5/85; A61C 5/88; A61C 19/04; A61C 5/80; A61C 5/04; A61C 3/00; A61C 3/10; A61C 7/04; A61B 17/282
USPC .......................................................... 433/226
See application file for complete search history.

(56) References Cited

U.S. PATENT DOCUMENTS

| | | | |
|---|---|---|---|
| 340,896 A | 4/1886 | Starr | |
| 816,828 A | 4/1906 | Smith | |
| 1,688,670 A | 10/1928 | Swendiman | |
| 2,123,475 A | 7/1938 | Sachs | |
| 2,698,483 A | 1/1955 | Berkowitz | |
| 3,305,928 A | 2/1967 | Tofflemire | |
| 3,521,510 A | 7/1970 | Angquist | |
| 3,626,995 A | 12/1971 | Keenan, Jr. | |
| 3,842,505 A * | 10/1974 | Eames | A61C 5/85 433/39 |
| 4,081,909 A | 4/1978 | Garcia | |
| 4,563,152 A | 1/1986 | McClure | |
| 5,330,353 A | 7/1994 | Wavrin | |
| 6,336,387 B1 | 1/2002 | Lee | |
| 6,345,983 B1 | 2/2002 | Godfrey | |
| 6,712,608 B2 * | 3/2004 | Bills | A61C 5/85 433/39 |
| 2003/0224324 A1 | 12/2003 | Dryer | |

(Continued)

FOREIGN PATENT DOCUMENTS

DE 202017006673 U1 * 1/2018 ............... A61C 5/85

*Primary Examiner* — Nicholas D Lucchesi
*Assistant Examiner* — Mirayda A Aponte
(74) *Attorney, Agent, or Firm* — Nguyen Tarbet LLC

(57) ABSTRACT

Dental matrix bands with novel surface structures and use thereof in dental procedures are described herein. The band features a three-dimensional surface structure that is contoured to an outer portion of a torus to allow the band to securely fit around a tooth. The band comprises: an outer surface of the band; an upper and lower edge of the band; a proximal and distal end of the band; and a flattened region disposed along the band. The outer surface of the band forms a first convex curve between the upper edge and the lower edge of the band and a second convex curve between the proximal and the distal end of the band. The flattened region can extend between the upper edge and the lower edge of the band and between the proximal and distal ends of the band.

1 Claim, 3 Drawing Sheets

(56) References Cited

U.S. PATENT DOCUMENTS

| | | |
|---|---|---|
| 2004/0106084 A1 | 6/2004 | Dryer |
| 2004/0146838 A1* | 7/2004 | Nugiel .................... A61C 5/85 433/226 |
| 2005/0287491 A1* | 12/2005 | Slone ...................... A61C 5/85 433/39 |
| 2008/0294190 A1 | 11/2008 | Young |
| 2017/0065371 A1 | 3/2017 | Ferrer |

* cited by examiner

DENTAL MATRIX BANDS

CROSS-REFERENCES TO RELATED APPLICATIONS

This application is continuation-in-part and claims benefit of U.S. patent application Ser. No. 15/980,414, filed May 15, 2018, the specification(s) of which is/are incorporated herein in their entirety by reference

BACKGROUND OF THE INVENTION

Field of the Invention

The present invention relates to a dental accessory, more particularly, to a matrix band that fits securely to a tooth for use in dental procedures.

Dental caries, also referred to as tooth decay, are permanently damaged structures of the tooth that are typically caused by plaque, bacteria, excessive sugar consumption, and improper or inadequate oral hygiene. Cavities caused by the tooth decay/caries often require treatment by restoration of the decayed tooth. During treatment, a dentist generally uses a dental hand piece and dental burs to remove all of the decayed structure from the tooth. After removing the caries, the tooth is left having a cavity. The dentist will place a dental matrix band around the tooth to provide temporary structural support, e.g. wall, to the cavity. The cavity is then filled with a dental filling material, such as composite resins, cement, ceramics, or dental amalgams, which is allowed to cure and set, thereby re-establishing the tooth structure.

Description of Related Art Including Information Disclosed

Dental matrix bands, including but not limited to those disclosed in U.S. Pat. No. 3,305,928 of Tofflemire, U.S. Pat. No. 5,330,353 of Wavrin, and U.S. Pat. No. 6,712,608 of Bills, are used to restore anatomic contours and contact areas of the tooth. Existing matrix bands used in dentistry today are typically metallic strips that may have a flat surface or concaved contour. A flat matrix band may be burnished or shaped to add a concaved contour. For example, U.S. Pat. No. 4,081,909 of Garcia discloses an orthodontic plier for bending orthodontic arch wires. If a matrix band is shaped with the plier of Garcia, the band would acquire a concaved contour. As shown in FIG. 3, one disadvantage of a concaved contour is that it creates a rounded point of contact to an adjacent tooth. This rounded point of contact lacks stability and is more prone to breaking, thus the filling will require future restoration. In addition, other bands often fail to restore proximal anatomy, may have thin contact, may create a large food trap, may increase likelihood of fracture, and/or may cause occlusal interference, recurrent caries, and/or periodontal disease. Hence, there is a need for matrix bands with features for improved contouring.

BRIEF SUMMARY OF THE INVENTION

The present invention features a dental matrix band. The matrix band features a three-dimensional surface structure that is contoured along an outer portion of a torus. The band may comprise: a) an outer surface of the band; b) an upper edge of the band and a lower edge of the band, wherein the outer surface of the band has a first convex curvature between the upper edge of the band and the lower edge of the ban; c) a proximal end of the band and a distal end of the band, wherein the outer surface of the band has a second convex curvature between the proximal end of the band and the distal end of the band; and d) a flattened region disposed along the band, between the upper edge and the lower edge of the band and between the proximal and distal ends of the band.

According to another embodiment, the matrix band may be used for a dental procedure, for example, during a restoration procedure for restoring a tooth having caries (FIG. 4). The method may comprise removing the caries from the tooth thereby forming at least one cavity in the tooth, placing the matrix band at least partially around the tooth so as to provide structural support to the cavity and filling the cavity with a dental filler material. Preferably, the flattened surface of the matrix band is positioned adjacent to a neighbouring tooth so as to form a broad, flat surface to a restored portion of the tooth that contacts or is adjacent to the neighbouring tooth. As used herein, the term "flat surface" or equivalent refers to an area lying on a two-dimensional plane. In addition to or in the alternative, a flat surface has straight contour lines in a two-dimensional (2-D) space. The broad flat surface can have increased stability as compared to a rounded point of contact, which can extend the lifetime of the restored portion.

One of the unique and inventive technical features of the present invention is the combination of curved and flat features of the band to create a curve at the top and/or bottom of the tooth with the mid portion is generally flat creating a flattened surface disposed along the band. Without wishing to limit the invention to any theory or mechanism, it is believed that the technical feature of the present invention advantageously forms a flattened surface on a midsection the matrix band, which when used during the tooth restoration procedure, forms the broad, flat contact surface (i.e. horizontal and vertical dimension) on the restored portion of the tooth. This broad, flat contact surface can have increased stability as compared to a rounded point of contact, which can extend the lifetime of the restored portion. None of the presently known prior references or work has the unique inventive technical feature of the present invention.

Analogous to the contact points between spheres and the contact points between square bricks, the additional benefits of the present invention include the following:
1. Provide better protection against food trapping between teeth.
2. Teeth with broad, flat contact surfaces are more stable than ones with pointed contacts. To illustrate this mechanism, a row of square bricks is less prone to moving and shifting than a row of balls aligned with each other.
3. Restored teeth with broad, flat contact surfaces are less prone to breaking or loosening than those restored teeth with pointed or round contact surfaces, shown in FIG. 4.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF SEVERAL VIEWS OF THE DRAWINGS

The features and advantages of the present invention will become apparent from a consideration of the following detailed description presented in connection with the accompanying drawings in which:

FIG. 1A shows a detailed view of the dental matrix band with identified features including the fattened region (surface). FIG. 1B shows a cross sectional view of the inner surface of the dental matrix band.

DETAILED DESCRIPTION OF THE INVENTION

Following is a list of elements corresponding to a particular element referred to herein:
- 10 matrix band
- 11 matrix band outer surface
- 12 matrix band upper edge
- 14 matrix band lower edge
- 15 matrix band inner surface
- 16 matrix band proximal end
- 17 matrix band distal end
- 19 flattened region (surface)
- 20 convex curve 1 (vertical)
- 22 convex curve 2 (horizontal)
- 25 matrix band upper projection
- 26 matrix band lower projection As used herein, the term "torus" refers to a surface of revolution generated by revolving a circle in three-dimensional space about an axis coplanar with the circle. In some embodiments, a portion of a surface of a dental matrix band may be shaped or contoured similar to a torus. If the axis of revolution does not touch the circle, the surface has a ring shape and is called a torus of revolution. As an example, a torus may be donut-shaped.

As used herein, the term "convex" refers to being curved like the exterior of a circle or sphere, or having at least one interior angle measuring less than 180°. With respect to the dental band, the outer surface of the band is convex.

As used herein, the term "concave" refers to being curved like the interior of a circle or sphere, or having at least one interior angle greater than 180°. With respect to the dental band, the inner surface of the band is concave, in direct contact with the tooth being restored.

As used herein, the term "flat surface", "flat region", or equivalent refers to an area lying on a two-dimensional plane. In addition to or in the alternative, a flat surface has straight contour lines in a 2-D space. For instance, the flattened surface (19) has straight contour lines on the Y-Z plane.

As used herein, the midsection is defined as middle location equidistant from a topmost point or top edge and from a lowermost point or bottom edge.

As used herein, the term "height" refers to the distance between a top edge and a bottom edge of a specified structure. As used herein, the term "width" refers to the distance between a first side edge and a second, opposing side edge of a specified structure.

Figure 1A:
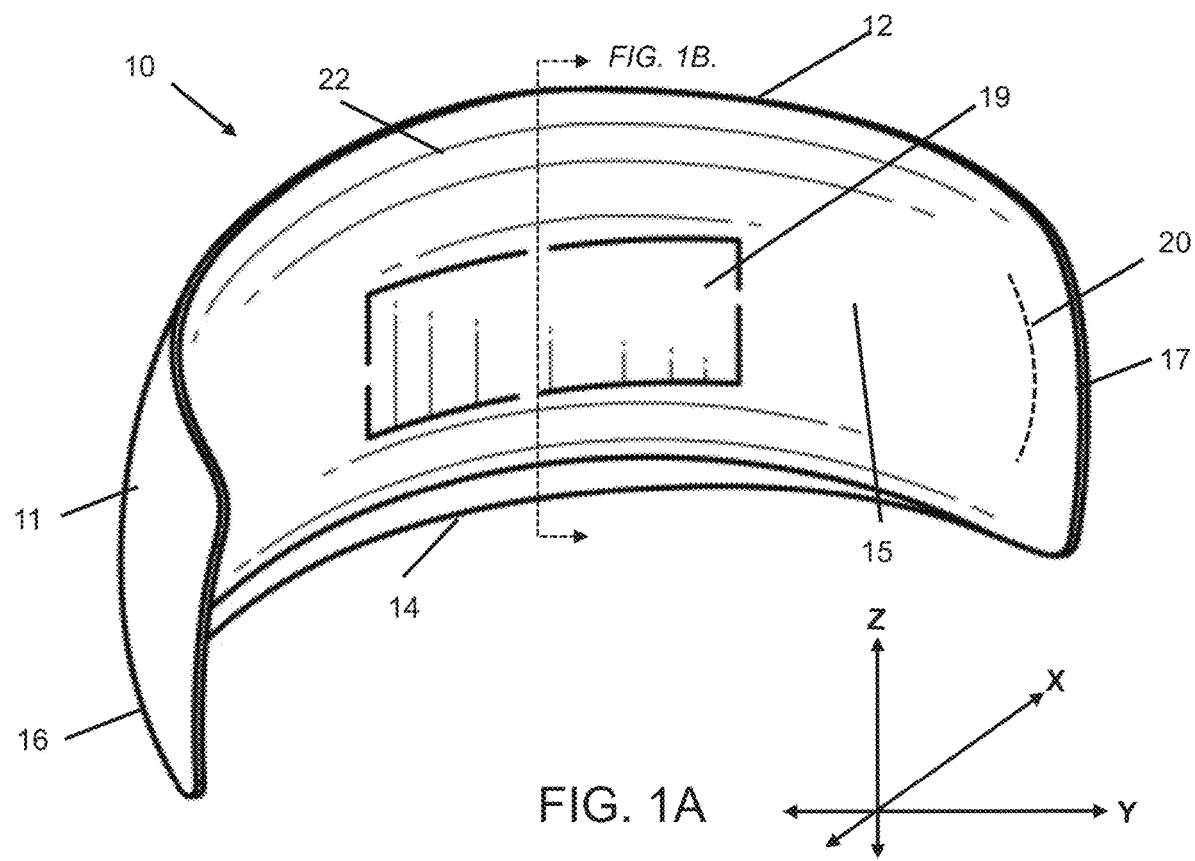
FIGS. 1A-1B show the features of the matrix band.
Figure 1B:
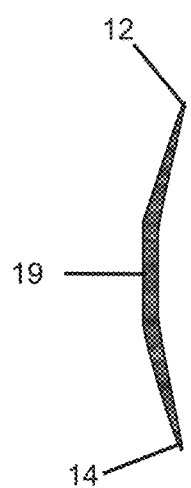

Referring now to FIGS. 1A-1B, the present invention features a matrix band (10) for dental procedures. The band (10) comprises an outer surface (11) that wraps around the Z-axis, an upper edge (12), a lower edge (14), a proximal end (16), a distal end (17), and a flattened region (19) disposed along the surface. In some embodiments, the flattened region is disposed on a midsection of the band or any specific section of the matrix band (depending on a preference of the dentist and/or contour of the tooth) to provide a flattened surface for optimal contact between adjacent teeth.

In some embodiments, the matrix band has a projection (25) along the upper edge of the band on a midsection or any specific section of the upper edge of the matrix band depending on a preference of the dentist and/or contour of the tooth. In other embodiments, the band has a projection (26) along the lower edge of the band on a midsection or any specific section of the lower edge of the matrix band depending on a preference of the dentist and/or contour of the tooth. The upper projection (25) may provide a gripping means for setting or removing the band. The lower projection (26) may rest upon the gums surrounding the tooth, thereby providing additional stability to the band.

Figure 4:
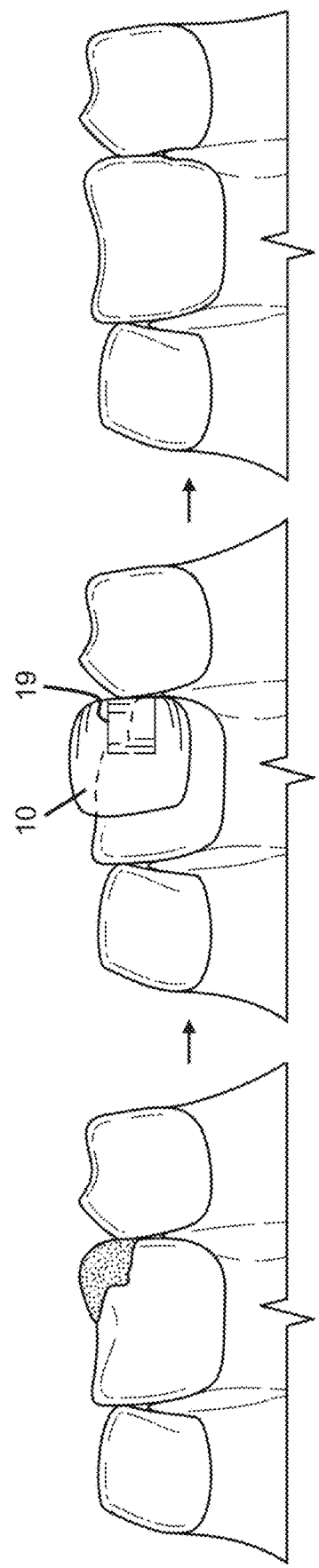
FIG. 4 is a schematic of restoring a tooth using a matrix band shaped to securely fit around the tooth.

The present invention also features a matrix band that can be used in dental procedures. A non-limiting example comprises the use of the dental matrix band (10) during a tooth restoration procedure. In some embodiments, the present invention features a method of restoring a tooth having caries. Referring to FIG. 4, the method may comprise removing the caries from the tooth, thereby forming at least one cavity in the tooth and providing the matrix band (10), which has a flattened surface (19) disposed on a midsection of the matrix band. The restoration method continues with placing the matrix band (10) at least partially around the tooth so as to provide structural support to the cavity and filling the cavity with a dental filler material, which is allowed to cure and/or set. Preferably, the flattened surface (19) of the matrix band is positioned adjacent to a neighbouring tooth. For example, the flattened surface (19) is positioned between the cavity and the neighbouring tooth.

After the filler material has set and hardened, the matrix band (10) is removed, thereby leaving the restored tooth. Without wishing to limit the invention to a particular theory or mechanism, the flattened surface (19) of the matrix band provides a broad, flat surface to a restored portion of the tooth that contacts or is adjacent to the neighbouring tooth. This broad flat surface can have increased stability as compared to a rounded point of contact, which can extend the lifetime of the restored portion.

Figure 3:
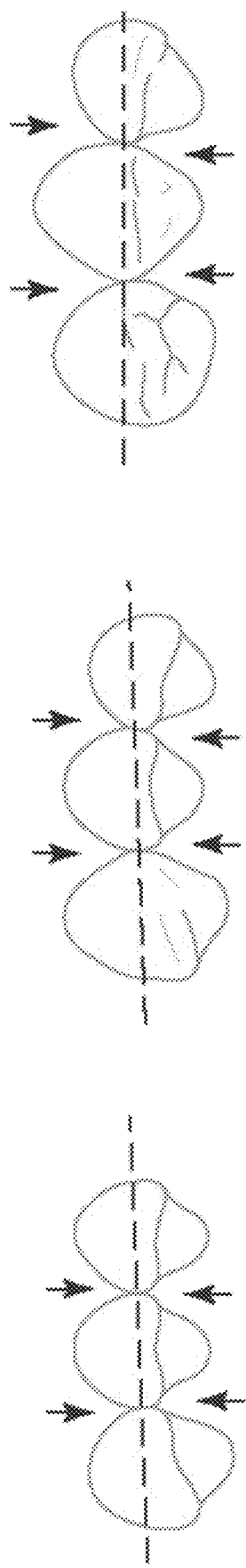
FIG. 3 shows is a diagram of teeth groups, wherein the arrows and dashed lines indicate points of contact between neighboring teeth.

In some embodiments, the inner surface of the band has a contour, taken from a cross-section between the top and bottom edges of the band at the midsection, comprising a first concave segment that transitions to a substantially straight segment, which transitions to a second concave segment (FIG. 1B). As shown in FIGS. 3-4, this contour of the matrix band allows for the restored portion of the tooth that is adjacent to the neighbouring tooth to have a contour comprising a convex curvature near the occlusal surface that transitions to a substantially flat surface adjacent to the neighbouring tooth, which transitions to a convex curvature in the apical direction.

Figure 2A:
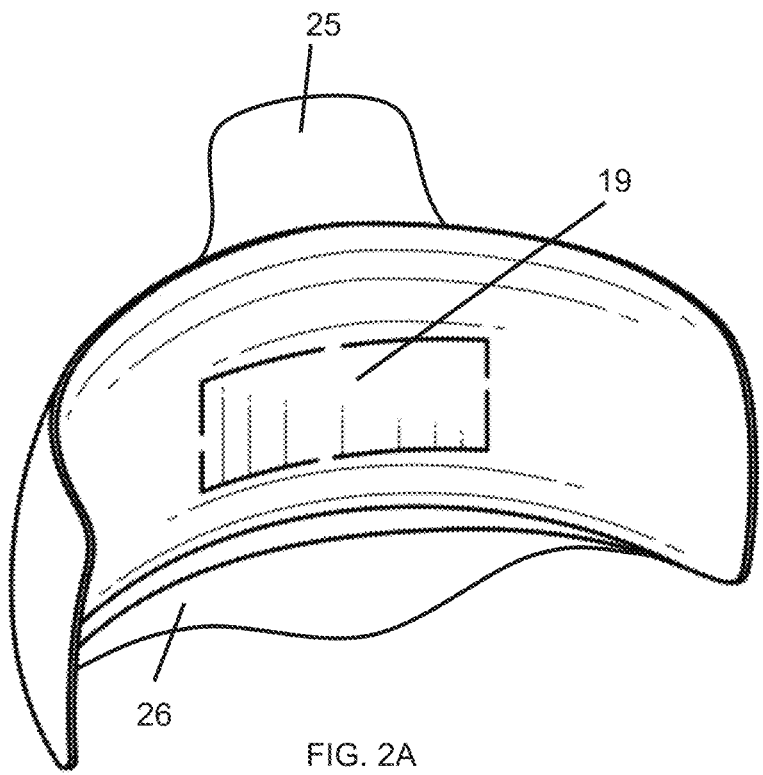
FIGS. 2A-2B show alternative embodiments of the present invention.
Figure 2B:
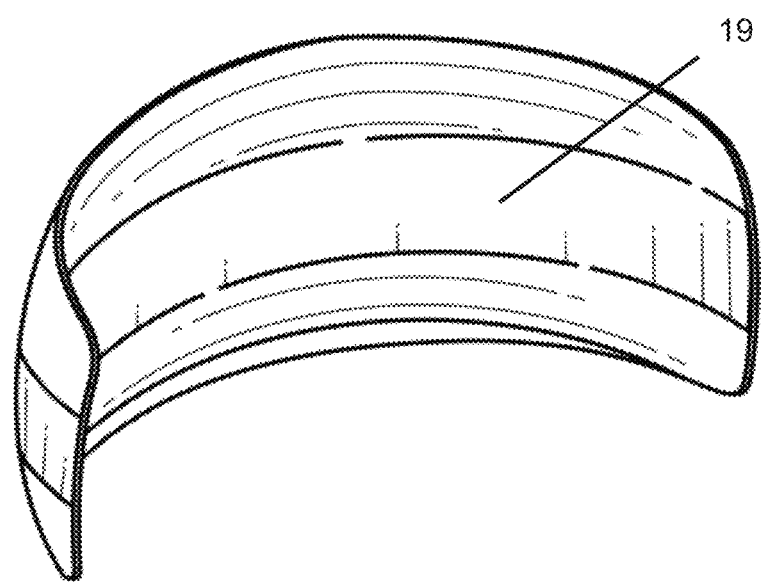

Non-limiting examples of the dental matrix band comprise a metallic strip or clear plastic strip having a flat inner surface (15) prior to shaping or a metallic strip having a concaved inner surface (15) prior to shaping from the top to the bottom edges. The midsection of the matrix band is a central area disposed between the top and bottom edges of the band. Further still, the midsection may be disposed between the side edges of the band. Unlike existing matrix bands, in some preferred embodiments, the matrix band of the present invention includes the flattened surface (19) formed and centrally disposed on at least a midsection of the band. As shown in FIGS. 1A and 2A, the matrix band has a rectangular flattened surface. Alternatively, or in addition, the matrix band can have a circular, oval or square flattened surface (not shown). In other embodiments, FIG. 2B shows the matrix band with a rectangular flattened surface that can span the entire width (from side to side) of the matrix band.

According to another embodiment, the present invention further features a dental matrix band comprising a band (outer) surface (11) bounded by an upper edge (12), a lower edge (14) opposite of the upper edge (12), a first end (16), and a second end (17) opposite of the first end (16), wherein the band surface has a convex curvature (20) between the upper edge (12) and the lower edge (14); and a flattened region (19) disposed on the band surface (11).

In some embodiments, the dental matrix band is of appropriate stiffness to allow optimal placement between teeth without requiring wedging. The material of the dental matrix band comprises a suitable thickness and flexibility to prevent tearing or crumbling of the band. Non-limiting examples of the material of dental matrix band comprise metal or plastic (e.g., light-cured composite resin). Non-limiting examples of the metal material include aluminium, silver, stainless steel, metal, composite, or combination thereof.

In some embodiments, the height of the dental matrix band comprises a height that sufficiently extends between top and bottom edges of a tooth with the upper projection extending a sufficient height to allow the placement utensil to effectively hold or grip the band using the upper projection for simple and accurate placement and/or removal of the dental matrix band.

In some embodiments, the height of the dental matrix band may range from about 5 mm to 12 mm, or at least an entire height of a tooth. For example, the height of the band may be 12 mm for a 10 mm tooth height. In some other embodiments, the width of the dental matrix band may range from 10 to 30 mm, 20 to 40 mm. In some other embodiments, the width of the dental matrix band encompasses the entire perimeter of a tooth.

In some embodiments, the area of the flattened surface may encompass a portion of the entire height and width of the dental matrix band. In other embodiments, the flattened surface may encompass about at least ¾, ½, ¼, or ⅛ of the area of the dental matrix band. Non-limiting examples of the width of the flattened surface comprise at least 2 mm, 3 mm, 4 mm, 5 mm, 40 mm, or at most 40 mm. Non-limiting examples of the height of the flattened region comprise at least 2 mm, 3 mm, 5 mm, 7 mm, or at most 7 mm. In preferred embodiments, a cross-section of the outer surface of the band taken from upper edge to lower edge includes a flattened region of the band that transitions from a first convex segment to a substantially straight segment, which transitions to a second convex segment, wherein the straight section is portion of the flattened region.

In some embodiments, the height of the upper projection may range from about ½ mm to about 5 mm. In other embodiments, the width of the upper projection can span a portion or the entire width of the upper edge.

In some embodiments, the height of the lower projection may range from about ½ mm to about 5 mm. In other embodiments, the width of the lower projection can span a portion or the entire width of the lower edge.

In appropriate circumstances, the dental matrix band has a non-stick coating to reduce composite adhesion. For example, the non-stick coating comprises Teflon.

As used herein, the term "about" refers to plus or minus 10% of the referenced number.

The disclosures of the following U.S. Patents are incorporated in their entirety by reference herein: U.S. Pat. Nos. 2,698,483, 4,081,909, US20040106084, U.S. Pat. Nos. 3,305,928, 530,353, 6,712,608.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A matrix band (10), herein referred to as a band (10), having a three-dimensional surface structure is contoured along an outer portion of a torus, the band comprising:
   a. an outer surface (11) of the band (10);
   b. an upper edge (12) of the band (10) and a lower edge (14) of the band (10), wherein the outer surface (11) of the band (10) forms a first convex curve (20) between the upper edge (12) of the band (10) and the lower edge (14) of the band (10);
   c. a proximal end (16) of the band (10) and a distal end (17) of the band (10), wherein the outer surface (11) of the band (10) forms a second convex curve (22) between the proximal end (16) of the band (10) and the distal end (17) of the band (10); and
   d. a flattened region (19) disposed along the band (10), between the upper edge (12) and the lower edge (14) of the band (10) and between the proximal end (16) and distal end (17) of the band (10);
   wherein a cross-section of the band taken from the upper edge (12) to the lower edge (14) at the flattened region (19) comprises a first convex segment that transitions to a straight segment, which transitions to a second convex segment, wherein the straight segment is a cross-section of the flattened region (19); and
   wherein the flattened region (19) has an area comprising at least ¾, ½, ¼, or ⅛ of a total area of the band (10), and wherein a shape of the flattened region (19) is square, rectangular, round, or oval.

* * * * *